United States Patent [19]

Fannin

[11] 3,972,551
[45] Aug. 3, 1976

[54] TELESCOPING ENERGY ABSORBER FOR VEHICLE BUMPERS AND METHOD OF ASSEMBLY

[75] Inventor: Wayne V. Fannin, Xenia, Ohio

[73] Assignee: General Motors Corporation, Detroit, Mich.

[22] Filed: June 4, 1975

[21] Appl. No.: 583,550

[52] U.S. Cl. .................. 293/85; 267/116; 293/DIG. 2
[51] Int. Cl.² ........................ B60R 19/06
[58] Field of Search .............. 293/85, 86, DIG. 2, 293/70; 188/289, 314; 267/64 R, 8 A, 8 R, 34, 116; 213/43

[56] References Cited
UNITED STATES PATENTS

| 2,325,430 | 7/1943 | Setz | 267/64 R X |
| 3,171,546 | 3/1965 | Frederick | 213/43 |
| 3,751,091 | 8/1973 | Renneker | 293/85 X |
| 3,804,446 | 4/1974 | Warrener | 293/70 X |
| 3,820,771 | 6/1974 | Kerr et al. | 293/85 X |
| 3,860,225 | 1/1975 | Nakamura | 293/86 X |
| 3,887,224 | 6/1975 | Browne | 293/85 |

Primary Examiner—Robert B. Reeves
Assistant Examiner—John P. Shannon
Attorney, Agent, or Firm—Charles R. White

[57] ABSTRACT

Telescoping energy absorber unit for bumper support incorporating an internal helical extension spring normally disposed in a centralized location that yieldably maintains the unit extended to provide a bumper preload and that expands on collapsing telescopic movement of the unit to load a column of oil therein to exert a return force urging the unit and bumper toward their extended positions.

4 Claims, 6 Drawing Figures

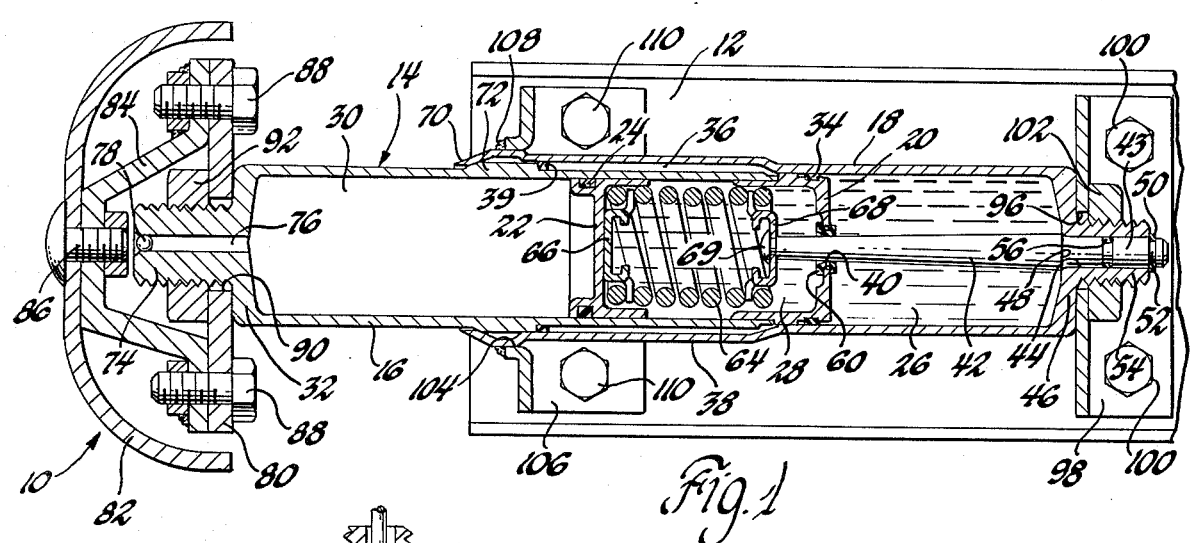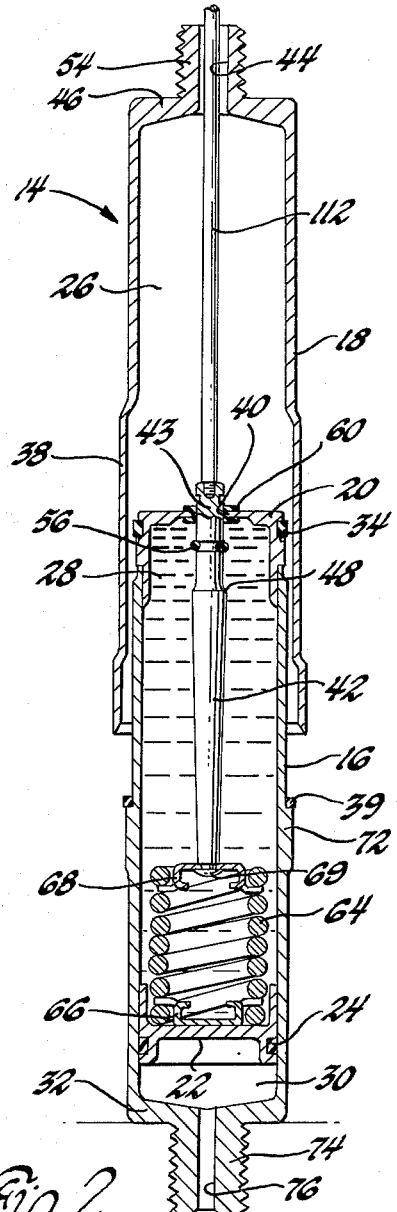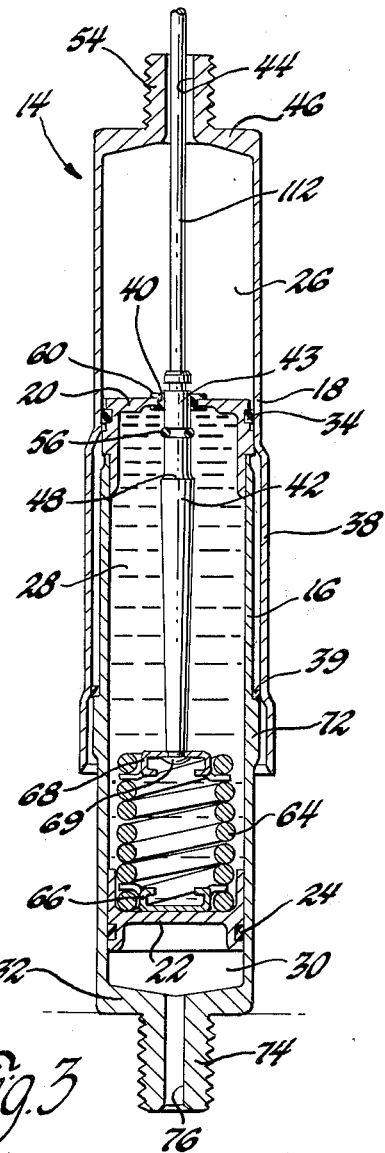

TELESCOPING ENERGY ABSORBER FOR VEHICLE BUMPERS AND METHOD OF ASSEMBLY

This invention relates to a telescoping energy absorber unit having an oil column loaded by a new and improved helical extension spring for urging the unit to an extended position and relates further to a new and improved method of assembly of such energy absorber units.

Prior to the present invention, telescoping energy absorber units yieldably supporting the bumpers of vehicles have been made with gas springs to provide a force on a column of oil contained therein to urge the energy absorber unit to an extended position. With such construction the vehicle bumper is yieldably held in a predetermined position until displaced by an impact load. After being displaced the units return the vehicle bumper back to its original position. While these prior energy absorber units have provided important benefits in yieldably supporting a bumper and protecting the vehicle from damage, particularly during low speed impacts, energy absorbers without gas springs are desired for some vehicle applications.

Prior telescoping energy absorbers with mechanical spring devices for preloading an oil column have heretofore been generally unsatisfactory from design, performance and cost standpoints. Helical compression springs used on some units as a direct replacement for gas springs have generally been unsatisfactory in view of the increased envelope lengths required to accommodate such springs whose deflection equals the stroke of the unit. Additionally, units having external helical springs require additional radial clearance, are difficult to mount and are subject to corrosion and limited service life. Belleville type washers have also been used as internal springs on some prior art energy absorbing devices. In view of added envelope length, weight, costs and assembly difficulties, such units are generally not desirable for a wide range of vehicle applications.

The telescoping energy absorber unit of this invention incorporates a piston tube telescopically mounted in a cylinder tube. A pair of fluid chambers are provided and fluid metered between these chambers converts impact energy into heat energy. An extension spring secured to a floating piston and to one end of the metering pin provides the necessary load on a column of oil that maintains or returns the telescoping energy absorber unit and the bumper assembly held thereby to an extended position. The internal spring is a one-piece helical spring which has one end connected to a metering pin and the other end connected to a piston or baffle member. As the unit is telescoped the spring extension being a function of the stroke times the ratio of the areas of the cylinder tube and piston tube minus the stroke requires less deflection space as compared to a unit in which a mechanical spring has been substituted for the gas spring. A shorter envelope length can be employed in this invention as compared to prior art units incorporating compression spring since the unit preferably incorporates a tapered metering pin which extends through an orifice in an end cap on one of the cylinders to control the flow of oil between fluid chambers in the unit and which provides improved centered support for the metering pin. This invention further is drawn to a new and improved method of assembling an energy absorber unit with a unitary spring device to preload an oil column within the unit.

Other features, objects and advantages of this invention will become more apparent from the following detailed description and drawings in which:

FIG. 1 is a longitudinal sectional view of an energy absorbing unit supporting a bumper assembly to bracket means secured to the vehicle frame.

FIGS. 2 through 6 are longitudinal sectional views of an energy absorbing unit illustrating a method of assembly.

Figure 4:
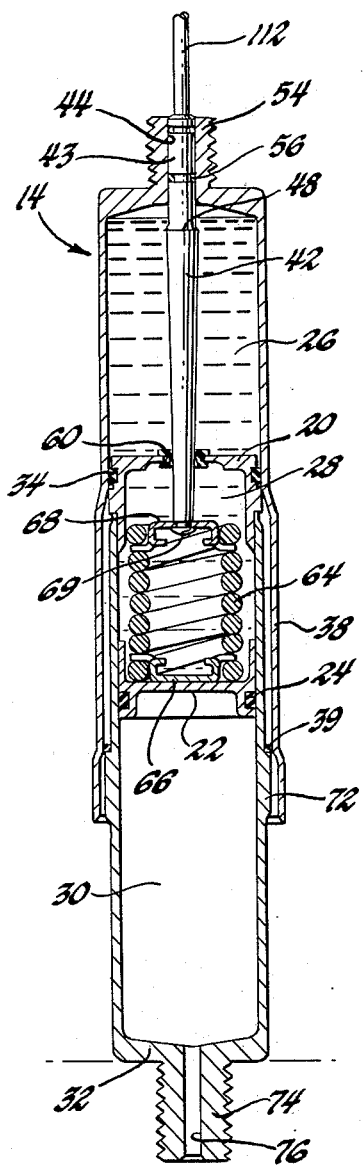
Figure 5:
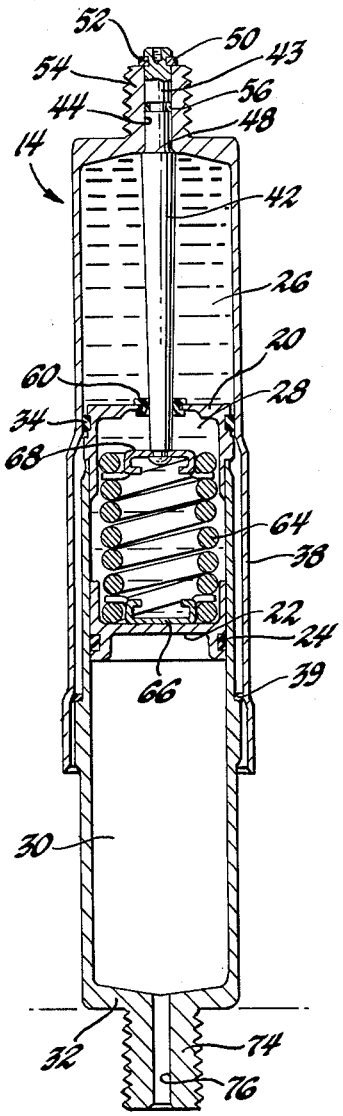

Turning now in greater detail to the drawings, there is shown in FIG. 1 a laterally extending front or rear bumper assembly 10 of a vehicle operatively connected to a side rail 12 of the vehicle frame by a telescoping energy absorbing unit 14. A second energy absorbing unit (not shown) identical to and laterally spaced from the energy absorber unit 14 is employed to connect the bumper assembly 10 to the other side rail of the vehicle frame hidden by side rail 12.

The energy absorber unit 14 comprises a piston tube 16 telescopically mounted in a cylinder tube 18. A cylindrical end cap 20 is secured to the inner end of the piston tube 16 and moves with the piston tube when that member telescopes in cylinder tube 18. The cap 20 cooperates with a baffle member or floating piston 22, mounted for longitudinal sliding movement in the piston tube 16, to provide a pair of interconnected expandable and contractible chambers 26 and 28 filled with a suitable oil or other liquid. A third chamber 30 formed in the piston tube 16 between the floating piston 22 and the forward end wall 32, filled with a suitable gas or open to atmosphere, accommodates the sliding movement of piston 22 and the expansion of chamber 28 when oil is fed from chamber 26 into chamber 28 during an energy absorbing operation of the unit as will be explained later. The floating piston 22 carries an annular seal 24 which contacts the inner wall of the piston tube 16 to prevent the leakage of fluid between chambers 28 and 30. An annular bearing member 34 of suitable material such as glass-filled Nylon is disposed around cap 20 to slidably fit the inner diameter of the cylinder tube 18. There is sufficient clearance between this bearing member and the inner wall of the cylinder tube so that a chamber 36 formed between a radially enlarged portion 38 of the cylinder tube 18 is in direct hydraulic communication with the chamber 26. Chamber 36 is sealed by annular seal 39 disposed between piston tube 16 and the inner wall of the enlarged portion 38 of the cylinder tube. The end cap 20 is formed with a central opening 40 through which an elongated and tapered metering pin 42 extends.

The metering pin 42 has a base end 43 that projects through a central opening 44 formed in the end wall 46 of the cylinder tube 18 and is retained in position by an abutment shoulder 48 formed on pin 42 and by a snap ring 50 seated in groove 52 that engages the exterior end wall of a threaded projection 54 which extends axially from the end wall 46. Seal 56 seated in a groove formed in the base end 43 of the metering pin 42 contacts the inner wall of the opening 44 to prevent the escape of fluid from chamber 26 through opening 44 to the exterior of the unit. The metering pin 42 projects through the central opening 40 in the end cap 20 and terminates in chamber 28 formed between the end cap 20 and the floating piston 22. A floating orifice 60 is adjustably mounted on the end cap 20 to receive the metering pin 42 to provide for any misalignment of the metering pin and the central opening 40 in the cap so that oil can be properly metered between chambers 26 and 28 during operation of the energy absorber unit 14.

In this invention an internal spring means is employed to provide a load on the oil in chambers 26 and 28 to urge the piston and cylinder tube toward their extended position. As shown in the preferred embodiment of the invention, this function is achieved by a helical extension spring 64 located in chamber 28. This spring has one end secured by a retainer 66 to the floating piston 22. The other end of the spring 64 is secured to a connector 68 which is in turn secured to the end 69 of the metering pin 42. With this construction the elongation or extension of spring 64 is equal to the relative movement between connector 68 and floating piston 22 when the unit is telescopically collapsed. This amount of spring movement is less than the movement required of a compression spring in chamber 30 directly acting on piston 22 since its deflection would be equal to the deflection of piston 22. Accordingly this invention provides for a substantial reduction in overall length of the unit as compared to prior art units.

The forward end of the cylinder tube 18 terminates in an inwardly crimped wall 70 which engages a radially extending stop ring 72 integral with the piston tube 16. The wall 70 and ring 72 provide a stop for the piston tube 16 when moving from a collapsed position to the fully extended position shown in FIG. 1.

An externally threaded projection 74 extends axially from the forward wall 32 of the piston tube and is used in the connection of the bumper assembly to the energy absorber unit as will be described. A central passage 76 is used to introduce a suitable inert gas into chamber 30. This passage is subsequently blocked by ball 78 welded therein. By increasing the quantity of gas in chamber 30 a gas spring in series with the extension spring can be provided. Preferably chamber 30 has only a small charge of gas or even may be open to the atmosphere with ball 78 being eliminated.

The bumper assembly 10 comprises a laterally extending backing beam 80 covered by a corresponding face bar 82. The face bar is secured to the backing beam by a plurality of laterally separated spacers 84 and nut and bolt fasteners 86 and 88. The threaded forwardly extending projection 74 of the energy absorbing unit 14 can be inserted through an opening 90 in the face bar 80 and a retainer nut 92 threaded on projection 74 can secure the face bar to the energy absorber unit 14.

The projecting threaded extension 54 of unit 14 may be inserted through an opening 96 in an end bracket 98, L-shaped in cross section, which is secured to the side rail 12 by bolts 100. A nut 102 threaded on the projection 54 secures the energy absorbing unit 14 to this bracket. The radially enlarged portion 38 of the cylinder tube 18 extends through a circular opening 104 in a front bracket 106 and is secured thereto by weld 108. The bracket 106 is L-shaped in cross section and is secured to the side rails by bolts 110.

Assuming that the bumper assembly has been impacted by a load sufficient to cause the telescopic stroking movement of the piston tube 16 into the cylinder tube 18, impact energy is dissipated by the metering of oil from contracting chamber 26 into chamber 28 through the orifice 60 progressively restricted by metering pin 42. Chamber 28 being thus supplied with oil will expand as chamber 26 contracts to cause an elongation of the helical spring 64. The space required for the expansion of spring 64 is less than the space required for the movement of a compression spring in chamber 30 directly acting on floating piston 22 or a gas spring. For example, in the present invention, if the stroke were 2 inches and the ratio of the area of the cylinder tube to the piston tube is 1.5, a piston movement of 3 inches minus the two inch stroke would occur. The resulting 1 inch deflection is less than a corresponding unit with a compression spring or gas spring in which a three inch deflection would occur and accordingly a longer overall envelope length would be required.

With spring 64 expanded increased spring force is exerted on the oil in chambers 28 and 26. This force is sufficient to return the energy absorbing unit from the collapsed position to the extended position shown in FIG. 1. Thus the extended spring 64 will contract to contract chamber 28 and force oil from that chamber back into chamber 26 which expands. With chamber 26 expanding, the piston tube 16 will be returned to its extended position as established by the contact of stop ring 72 of the piston tube and the crimped wall 70 of the cylinder tube.

Figure 6:
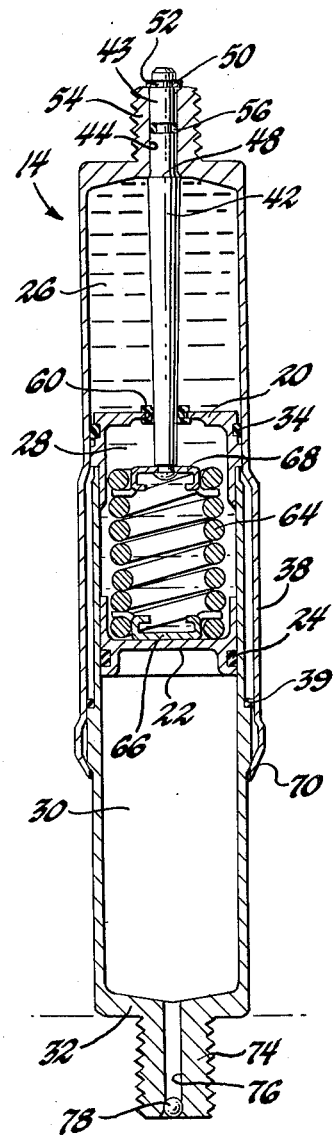

FIGS. 2 through 6 disclose a preferred method of assembly of the energy absorber unit of this invention and illustrates how the extension spring 64 is installed and trapped in an intermediate and operative position in the unit. Initially the floating piston 22, extension spring 64 and metering pin 42 are assembled together and installed in the piston tube 16. Oil is then introduced into the piston tube and the end cap 20 is fitted onto the inner end of the piston tube 16 with the base of the metering rod extending through the floating orifice 60. An elongated assembly rod 112 is threaded into the end of the metering pin 42 and the cylinder tube 18 is installed over the piston tube as shown in FIG. 2 with the rod 112 projecting through opening 44. FIG. 3 shows the cylinder tube 18 being moved downwardly on the piston tube 16 until the seal 39 sealingly engages the inner wall of cylinder tube 16 to seal chamber 36. Subsequently the rod 112 is pulled upwardly to displace the metering pin 42 to the FIG. 4 position. In this position, seal 56 engages the inner wall of passage 44 to seal chamber 26 and fluid is forced from chamber 28 into chambers 26 and into chamber 36. A snap ring 50 is installed in groove 52 to retain the metering pin in position with the shoulder 48 engaging the inner wall of the cylinder tube 18. After the metering pin is secured the forward edge 70 of the cylinder tube 18 is crimped inwardly as shown in FIG. 6 to provide a limit stop for the piston and cylinder tube. In the FIG. 6 position, the spring 64 has initial tension loading to separate the coils to provide a pulling force on the floating piston to pressurize the oil in chambers 26 and 28 to maintain the energy absorber unit in the extended position.

With the unit's energy absorbing unit assembled as described mounting brackets 106 can be welded to the unit and can be attached to the vehicle frame and a bumper assembly can be attached to the energy absorber unit as previously described.

While a preferred embodiment and method of assembly of this invention has been shown and described to illustrate the invention, other embodiments and methods may be adapted such as fall within the scope of the appended claims.

I claim:

1. An energy absorber unit for yieldably supporting a vehicle bumper to support structure comprising an elongated piston tube, a cylinder tube, means mounting said piston tube for telescopic movement within said cylinder tube, a floating piston mounted for axial movement in said piston tube, a cap mounted on the end of said piston tube and separating said piston tube and said cylinder tube into first and second chambers, an orifice in said cap, an oil filling each of said chambers, a helical extension spring mounted in said first chamber, means connecting one end of said extension spring to said floating piston, a metering pin extending from the end of said cylinder tube through said orifice in said cap to a terminal end in said first chamber, means connecting the other end of said extension spring to said terminal end of said metering pin, said metering pin providing means for restricting said orifice as said unit is telescopically collapsed to absorb energy imparted to said unit, said floating piston being movable in said unit in response to collapse of said unit to expand said helical spring which provides a load on the oil contained in said chambers for returning said unit to an extended position when said impact load is removed.

2. An energy absorber unit for yieldably supporting a vehicle bumper to support structure comprising an elongated cylindrical piston tube, a cylinder tube, means mounting said piston tube for telescopic movement within said cylinder tube between a collapsed position and an extended position, a disc-like floating piston mounted for axial movement in said piston tube, a cap mounted on the end of said piston tube and cooperating orifice said floating piston and said piston tube and said cylinder tube to provide first and second variable volume chambers, central orifice in said cap for hydraulically connecting said first and second chambers, an oil filling each of said chambers, a helical extension spring mounted in said first chamber, means connecting one end of said extension spring to said floating piston, a tapered fluid metering pin for progressively restricting said orifice as said piston tube telescopes in said cylinder tube, means securing said metering pin to the end of said cylinder tube so that said pin extends axially through said oriface in said cap to a terminal end in said first chamber, means connecting the other end of said extension spring to said terminal end of said metering pin, said floating piston being movable in said unit in reponse to the telescopic collapse of said unit and flow of oil from said second chamber to said first chamber to expand said second chamber and elongate said spring whereby a spring load is placed on the oil in said chambers to urge said tubes toward said extended position.

3. An impact energy absorber unit for mounting a bumper assembly to a support structure of an automobile comprising first and second cylinders, support means mounting said first cylinder for telescoping movement with respect to said second cylinder between an extended position and a retracted position, piston means mounted for longitudinal movement in said first cylinder, said first cylinder having a cap secured to the end portion thereof to cooperate with said piston means to form a first variable volume fluid chamber in said first cylinder and to form a second chamber in said second cylinder, a hydraulic fluid in said chambers, an aperture formed in said cap to provide hydraulic communication between said first and second chambers, an elongated metering rod extending longitudinally in said unit through said aperture to a terminal position in said first chamber, means securing said rod to one of said cylinders, a coiled spring mounted in said first chamber, means securing one end of said coiled spring to said piston, and means securing the other end of said coil spring to said rod whereby said spring will be extended in response to the telescoping movement of said first cylinder into said second cylinder and the expansion of said spring to provide a spring force on said oil in said chambers to move said cylinders to said extended position.

4. An impact energy absorber unit for mounting a bumper assembly to a support structure of an automobile comprising first and second cylinders, support means mounting said first cylinder for telescoping movement with respect to said second cylinder between an extended position and a retracted position, piston means mounted for longitudinal movement in said first cylinder, an end cap secured to the inner end of said first cylinder and cooperating with said movable piston to form a first variable volume fluid chamber and cooperating with said second cylinder to form a second variable volume fluid chamber, a hydraulic fluid filling said fluid chambers, a central opening formed in said cap to provide hydraulic communication between said first and second chambers, an elongated fluid metering rod extending longitudinally in said unit and through said central opening to a terminal position in said first chamber for progressively restricting said central opening as said first cylinder telescopes into said second cylinder, means securing said rod to said one end of said second cylinder, a coiled extension spring mounted in said first chamber, first connector means securing one end of said coiled spring to said piston and second connector means securing the other end of said coil spring to the end of said metering rod terminating in said first chamber whereby said oil is forced from said second chamber to said first chamber and said spring is extended in response to the telescoping movement of said first cylinder into said second cylinder and the extension of said spring provides a spring force on said oil in said chambers to urge said cylinders to move to said extended position.

* * * * *

UNITED STATES PATENT AND TRADEMARK OFFICE
CERTIFICATE OF CORRECTION

PATENT NO. : 3,972,551
DATED : August 3, 1976
INVENTOR(S) : Wayne V. Fannin

It is certified that error appears in the above–identified patent and that said Letters Patent are hereby corrected as shown below:

Column 5, line 29, "orifice" should be -- with --.

Same column, line 40, "oriface" should be -- orifice --;

line 44, "reponse" should be -- response --.

Signed and Sealed this

Eighth Day of February 1977

[SEAL]

Attest:

RUTH C. MASON
*Attesting Officer*

C. MARSHALL DANN
*Commissioner of Patents and Trademarks*